United States Patent
Neuhofer, Jr.

(10) Patent No.: US 6,287,046 B1
(45) Date of Patent: Sep. 11, 2001

(54) DEVICE FOR FIXING LONGITUDINALLY GROOVED COVER STRIPS

(76) Inventor: Franz Neuhofer, Jr., Haslau 56, A-4893 Zell am Moos (AT)

( * ) Notice: Subject to any disclaimer, the term of this patent is extended or adjusted under 35 U.S.C. 154(b) by 0 days.

(21) Appl. No.: 09/293,711

(22) Filed: Apr. 16, 1999

(30) Foreign Application Priority Data

Apr. 20, 1998 (AT) .................................................. 257/98 U

(51) Int. Cl.$^7$ .................................................. A47G 27/04
(52) U.S. Cl. .................................. 403/382; 16/16; 16/4
(58) Field of Search .......................... 16/16, 4; 403/382, 403/403, 381, 363

(56) References Cited

U.S. PATENT DOCUMENTS

| | | | |
|---|---|---|---|
| 2,073,278 | * | 3/1937 | Hohl ...................................... 16/16 X |
| 2,230,688 | * | 2/1941 | Irwin ...................................... 16/7 X |
| 2,927,339 | * | 3/1960 | Grunwald ................................ 16/16 |
| 2,996,751 | * | 8/1961 | Roby et al. ............................... 16/7 |
| 4,385,850 | * | 5/1983 | Bobath ............................ 403/403 X |
| 5,096,753 | | 3/1992 | McCue et al. . |
| 5,661,874 | * | 9/1997 | Latour ...................................... 16/4 |

FOREIGN PATENT DOCUMENTS 2169935A    7/1986    (GB) .

* cited by examiner

Primary Examiner—Lynne H. Browne
Assistant Examiner—John R. Cottingham
(74) Attorney, Agent, or Firm—Collard & Roe, P.C.

(57) ABSTRACT

A device for fixing longitudinally grooved cover strips consists of a holding plate to be fixed with its rear side on a wall, which holding plate has at least one forwardly protruding holding leg to be clampingly inserted in a longitudinal groove of the cover strips. To achieve a neat laying of the cover strips even with uneven wall surfaces in an economic way, the holding plate together with its holding legs has been prolonged to form a holding rail (1), whose holding legs (2, 3) extending like webs across the length of the holding rail form resilient clamping parts transverse to the longitudinal direction.

5 Claims, 4 Drawing Sheets

DEVICE FOR FIXING LONGITUDINALLY GROOVED COVER STRIPS

FIELD OF THE INVENTION

This invention relates to a device for fixing longitudinally grooved cover strips, comprising a holding plate to be fixed with its rear side on a wall or the like, which holding plate has at least one forwardly protruding holding leg to be clampingly inserted in a longitudinal groove of the cover strips.

DESCRIPTION OF THE PRIOR ART

Such devices are used for the clip-like fixing of cover strips, such as mop boards or other skirt boards or end strips, which strips having longitudinal grooves adapted to the holding legs in arrangement and cross-section can be clampingly mounted on the pre-assembled holding plates, so that an invisible fixing possibility is obtained, and the strips can be assembled and, if necessary, be disassembled without separate screw connections or nailings. The known devices now comprise holding plates designed as individual fittings, which must be screwed to the supporting wall surface with a mutual distance, which for an exact attachment of the strips requires a planar wall. In the case of curved walls or similarly uneven walls, there are often formed gaps between wall surface and cover strip between the individual fixing fittings and there are also major tensions in the cover strips, which may even endanger the strip holder itself. A proper assembly of the strip therefore requires a careful setting of the fixing fittings with larger or smaller distances adapted to the respective conditions of the supporting wall, which leads to a considerable assembly effort.

It is therefore the object underlying the invention to create a fixing device as described above, which with a relatively simple assembly involves an exact strip attachment largely independent of the respective supporting wall.

SUMMARY OF THE INVENTION

This object is solved by the invention in that the holding plate together with its holding legs has been prolonged to form a holding rail, whose holding legs extending like webs across the length of the holding rail form resilient clamping parts transverse to the longitudinal direction. These holding rails have been adapted in their length to the length of the cover strips to be mounted and are fixed at the supporting wall or the like as continuous holding rails, so that with their holding legs they form a continuous holder for the cover strips, which as in the fixing fittings are clampingly pressed onto the holding legs with their longitudinal grooves adapted to the holding legs. The continuous clamp fit of the cover strips on the holding rails ensures a safe and proper connection of the cover strips with the holding rail and thus a proper extension of the strips also with respect to an uneven wall surface, to which uneven portions the holding rail together with the cover strip can easily conform due to its sufficient bending elasticity. Since the assembly length leads to manufacturing- and laying-related vertical tolerances, the holding legs form resilient clamping parts transverse to the longitudinal direction, which clamping parts compensate these vertical tolerances due to their resilience and nevertheless lead to the required clamping connection between holding leg and cover strip. Depending on the application, the holding rail can have a different cross-section like the known fixing fittings, and to facilitate the assembly it can have a forwardly bent bottom flange to be placed on the ground, for use in the vicinity of the inner edge it can have a suitable bent cross-section adapted to the conditions of the inner edge, and the like.

When the holding legs have clamping lips formed at a web portion in a wedge-like manner, preferably vertically offset with respect to each other, clamping parts are formed which can bridge a relatively large range of tolerance and ensure a sufficiently stable mounting of the cover strips.

Another possibility of providing suitable clamping parts is obtained in that the holding legs are longitudinally ribbed on both sides and at the insertion side have a longitudinal slot, so that the slotted holding legs provide the required resilience and together with the longitudinal ribs a relatively firm clamping connection in the range of tolerance can be achieved.

BRIEF DESCRIPTION OF THE DRAWING

In the drawing, the subject-matter of the invention is represented by way of example, wherein.

DESCRIPTION OF THE PREFERRED EMBODIMENT

Figure 2:
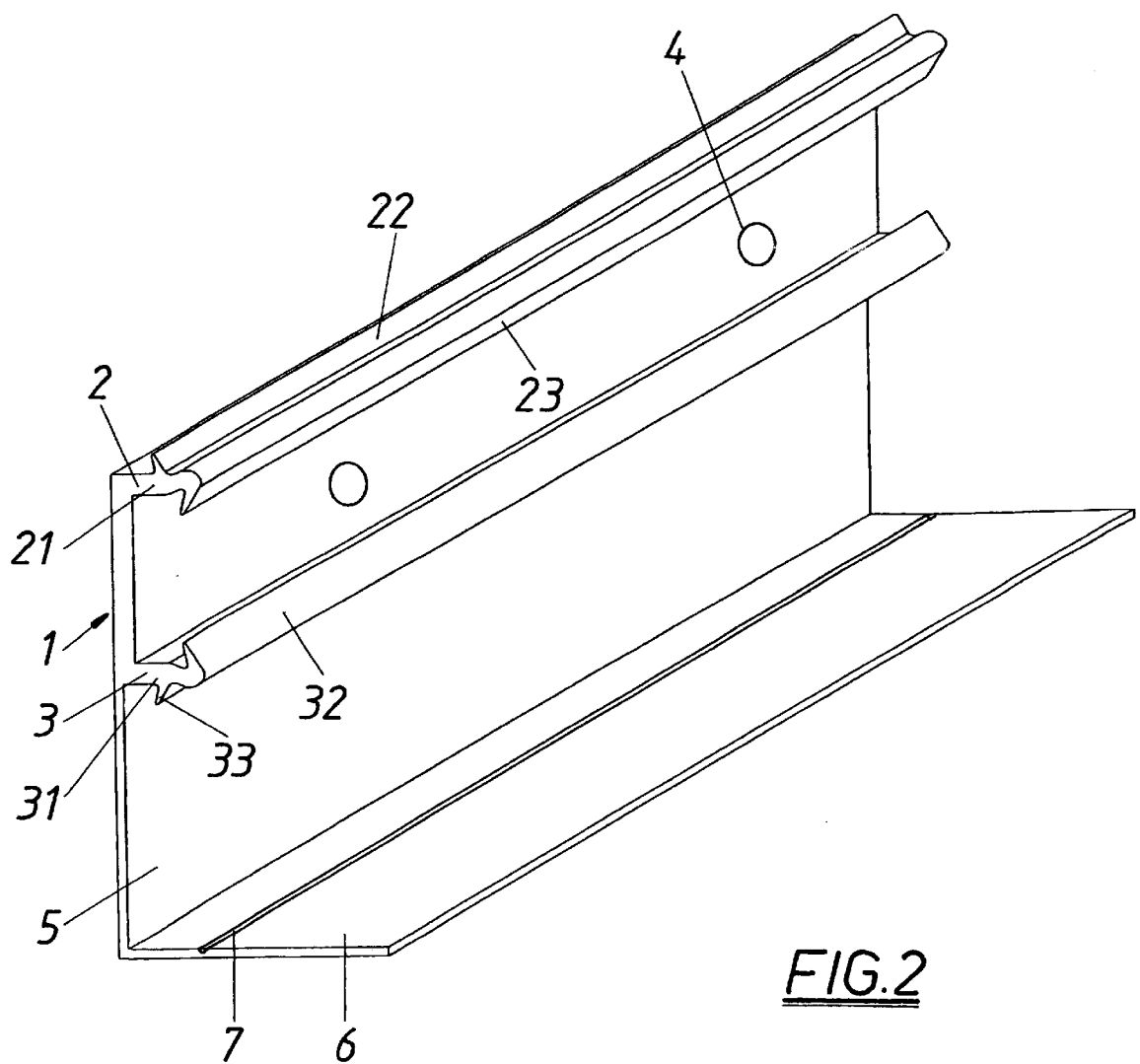
FIG. 2 shows the holding rail of this device in a schematic diagram.

For fixing longitudinally grooved cover strips there is provided a holding rail 1 with two spaced, forwardly protruding holding legs 2, 3, which like webs continuously extend across the length of the holding rail and form resilient clamping parts transverse to the longitudinal direction, where in accordance with the embodiment shown in FIG. 2, clamping lips 22, 23, 32, 33, which are formed at a web portion 21, 31 and are vertically offset with respect to each other, are used as clamping parts. Between the holding legs 2, 3 fixing holes 4 are provided in the holding rail 1, and as an assembly aid the holding rail 1 is widened at the ground by a forwardly bent bottom flange 5 with a supporting leg 6, which supporting leg 6 can preferably be adapted in its dimension to the respective assembly conditions by a predetermined breaking point 7.

Figure 1:
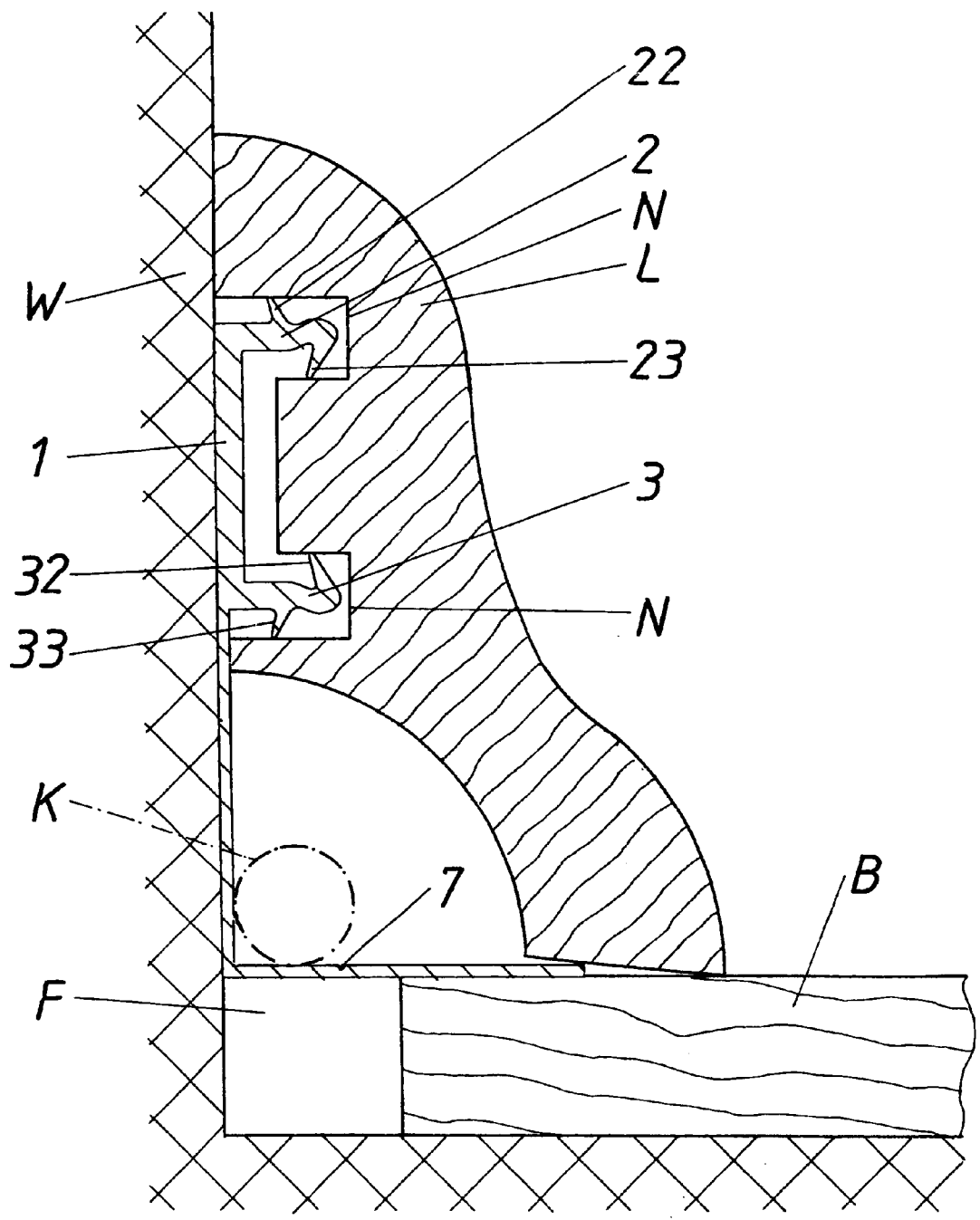
FIG. 1 shows a cross-section of a cover strip fixed by means of a device in accordance with the invention.

As is illustrated in FIG. 1, the holding rail 1 is fixed on a wall W with its rear side, for which purpose the holding rail 1 is supported with its bottom flange 5 as stop on the ground B, and then screw holes are drilled into the wall W at the point of the fixing holes 4. Upon screwing down the holding rail 1, the bottom flange 5 lies on the ground B with its supporting leg 6, thereby bridging a possibly existing expansion joint F between the wall W and the ground B, so that on the one hand the joint F leaves the proper seat of the fixing rail unimpaired, and on the other hand the bottom flange bridging the joint F can be inserted as support for a cable K laid along the wall W. A cover strip L can now be clamped onto the fixing rail in the manner of a clip, for which purpose said cover strip has longitudinal grooves N adapted to the holding legs 2, 3 and the clamping parts thereof. The spring properties of the clamping parts transverse to the longitudinal direction of the holding rail provide for a compensation of the manufacturing- and laying-related vertical tolerances between cover strip L and holding rail 1.

Figure 3:
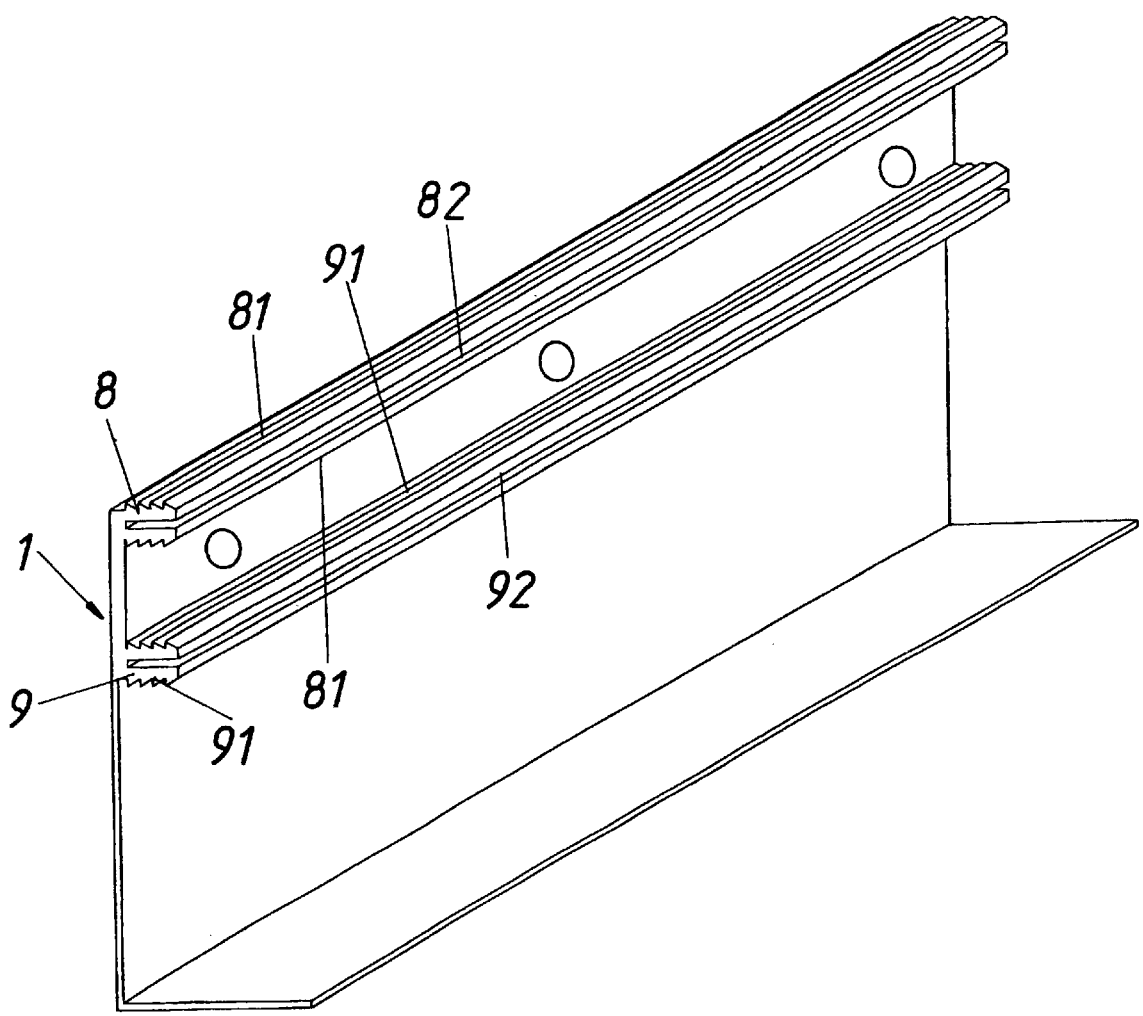
FIGS. 3 and 4 show two modified embodiments of an inventive holding rail, likewise in a schematic diagram.

In accordance with the embodiment shown in FIG. 3, the holding rail 1 has two holding legs 8, 9, which themselves act as resilient clamping parts and for this purpose have longitudinal ribs 81, 91 on both sides and on the insertion side are provided with a longitudinal slot 82, 92.

Figure 4:
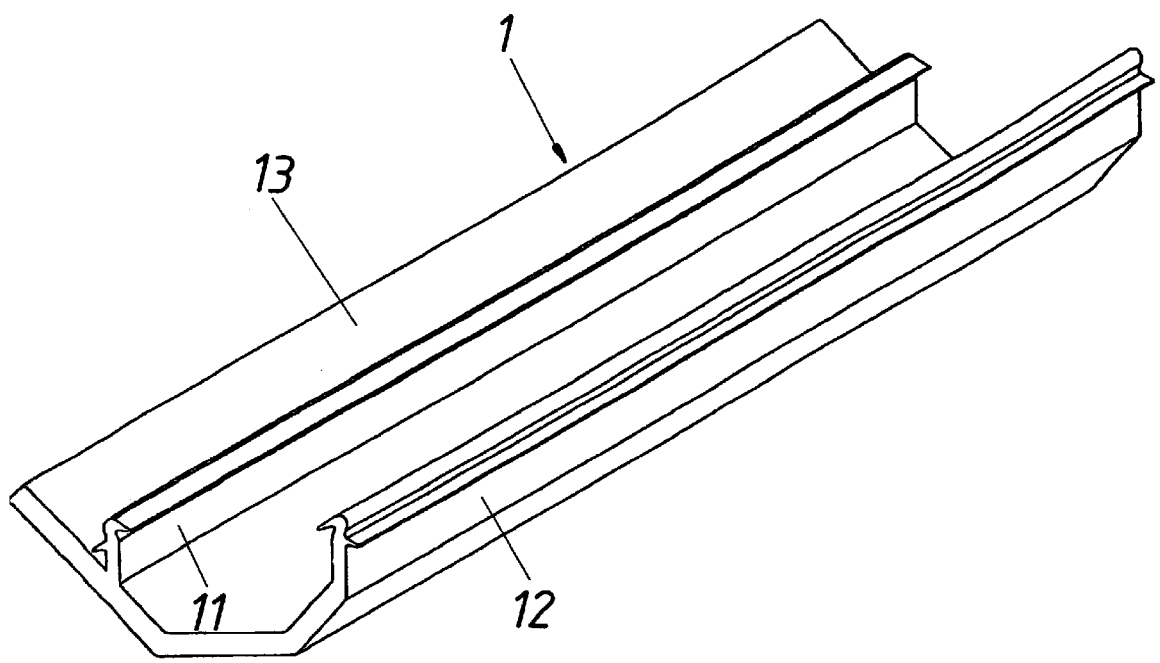

As is indicated in FIG. 4, the holding rail 1 can also have a substantially C-shaped cross-section 10, which enables an assembly along an inner edge. The marginal legs of the cross-section are designed as holding legs 11, 12, where in addition to bridging the marginal joint or the like, a supporting leg 13 inclined at an angle of 45° with respect to the rear side of the rail may be attached.

What is claimed is:

1. In combination, a cover strip defining a groove extending in a longitudinal direction and a device for fixing the cover strip to a surface, the device comprising
   (a) an elongated holding plate having a rear side adapter to be affixed to the surface and a front side, and
   (b) two web-shaped, resilient holding legs spaced from each other, projecting forwardly from the front side of the holding plate and clamped in the longitudinal groove of the cover strip, contacting both sides of the groove and extending along the length of the holding plate,
   (1) the holding plate and the web-shaped holding legs forming an elongated holding rail and
   (2) the holding legs defining therebetween a slot extending in the longitudinal direction and open to the longitudinal groove of the cover strip and forming clamping parts resilient transversely to the longitudinal direction.

2. The fixing device of claim 1, further comprising wedge-shaped clamping lips extending along the length of the web-shaped holding legs.

3. The fixing device of claim 2, wherein the clamping lips are vertically offset with respect to each other.

4. The fixing device of claim 1, wherein the web-shaped holding legs have outwardly protruding ribs extending along the length of the holding legs.

5. The fixing device of claim 1, wherein the elongated holding rail has sufficient bending elasticity to conform to an uneven surface.

* * * * *